(12) United States Patent
Jones et al.

(10) Patent No.: US 8,704,524 B2
(45) Date of Patent: Apr. 22, 2014

(54) CONNECTION METHOD OF REPLACEABLE SENSORS FOR RESISTIVITY ARRAYS

(75) Inventors: Allan R. Jones, Spring, TX (US); Randy Gold, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 308 days.

(21) Appl. No.: 13/232,651

(22) Filed: Sep. 14, 2011

(65) Prior Publication Data

US 2013/0063150 A1 Mar. 14, 2013

(51) Int. Cl.
*G01V 3/00* (2006.01)

(52) U.S. Cl.
USPC .......................................... 324/347; 324/355

(58) Field of Classification Search
USPC .................................................. 324/347, 355
See application file for complete search history.

(56) References Cited

U.S. PATENT DOCUMENTS

| 4,039,237 | A | 8/1977 | Cullen et al. |
|---|---|---|---|
| 6,231,353 | B1 | 5/2001 | Rathburn |
| 6,933,726 | B2 | 8/2005 | Chen et al. |
| 7,074,064 | B2 | 7/2006 | Wallace |
| 7,193,420 | B2 | 3/2007 | Chen et al. |
| 7,671,597 | B2 | 3/2010 | Finci et al. |
| 7,723,989 | B2 | 5/2010 | He et al. |
| 7,759,942 | B2 | 7/2010 | Clark et al. |
| 7,986,144 | B2 | 7/2011 | He et al. |
| 2006/0189208 | A1 | 8/2006 | Shaikh |
| 2006/0273799 | A1 | 12/2006 | Hunziker et al. |

FOREIGN PATENT DOCUMENTS

| EP | 1150392 A1 | 10/2001 |
|---|---|---|
| GB | 899979 | 6/1962 |

*Primary Examiner* — Reena Aurora
(74) *Attorney, Agent, or Firm* — Mossman Kumar & Tyler PC

(57) ABSTRACT

An apparatus and method for conducting resistivity logging in a borehole. The apparatus may include a housing configured for fluid isolation, an electrical conductor penetrating the housing and a sealing interface. The apparatus may also include at least one of: an electrical component inside the housing and an electrode disposed on the exterior of the housing. The apparatus is configured to allow the electrical conductor to be moved, while maintaining the sealing interface, between an electrically connected state and an electrically disconnected state with at least one of: the electrical component and the electrode. The method may include using the apparatus for resistivity logging operations.

20 Claims, 4 Drawing Sheets

CONNECTION METHOD OF REPLACEABLE SENSORS FOR RESISTIVITY ARRAYS

FIELD OF THE DISCLOSURE

This disclosure generally relates to exploration for hydrocarbons involving electrical investigations in a borehole penetrating an earth formation.

BACKGROUND OF THE DISCLOSURE

Electrical earth borehole logging is well known and various devices and various techniques have been described for this purpose. Broadly speaking, there are two categories of electrical logging devices. In the first category, a transmitter (such as a current electrode) is used in conjunction with a diffuse return electrode (such as the tool body). A measured electric current flows in a circuit that connects a current source to the transmitter, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present disclosure belongs to the first category.

With tools in the first category, the electrode mandrel sensors are often non-serviceable in the field, since electrodes may not be removed/installed without compromising the fluid seal between the interior and exterior of the logging device. This disclosure addresses these and other problems.

SUMMARY OF THE DISCLOSURE

In aspects, the present disclosure is related to methods and apparatuses for conducting borehole investigations involving electric current injected into an earth formation.

One embodiment according to the present disclosure includes an apparatus for downhole use, comprising: an electrical conductor; at least one electrical component in electrical communication with the electrical conductor; and a housing having a passageway receiving the electrical conductor and an interior receiving the at least one electrical component; and a sealing interface configured to maintain fluid isolation across the passageway, wherein the at least one electrical component is configured to move between an electrically connected state and an electrically disconnected state with the electrical conductor while maintaining the sealing interface.

Another embodiment according to the present disclosure includes an apparatus for downhole use, comprising: an electrical conductor; at least one electrical component in electrical communication with the electrical conductor; a housing having a passageway receiving the electrical conductor and an interior receiving the at least one electrical component; a sealing interface configured to maintain fluid isolation across the passageway; and an electrode in electrical communication with the at least one electrical component and configured to move between an electrically connected state and an electrically disconnected state with the at least one electrical component while maintaining the sealing interface, wherein the housing is configured to receive the electrode, and wherein the electrical conductor is completely radially disposed within an outer circumferential surface of the electrode.

Another embodiment according to the present disclosure includes a method of conducting resistivity logging operations in a borehole penetrating an earth formation, comprising: conducting resistivity logging using a resistivity logging tool, the resistivity logging tool comprising: an electrical conductor; at least one electrical component in electrical communication with the electrical conductor; a housing having a passageway receiving the electrical conductor and an interior receiving the at least one electrical component; a sealing interface configured to maintain fluid isolation across the passageway; and an electrode in electrical communication with the at least one electrical component and configured to move between an electrically connected state and an electrically disconnected state with the at least one electrical component while maintaining the sealing interface, wherein the housing is configured to receive the electrode, and wherein the electrical conductor is completely radially disposed within an outer circumferential surface of the electrode.

Examples of certain features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

This disclosure generally relates to exploration for hydrocarbons involving electrical investigations of a borehole penetrating an earth formation. More specifically, the present disclosure is related to conducting investigations using a tool configured for removal/installation of an electrical component and/or electrode while maintaining a fluid seal.

Figure 1:
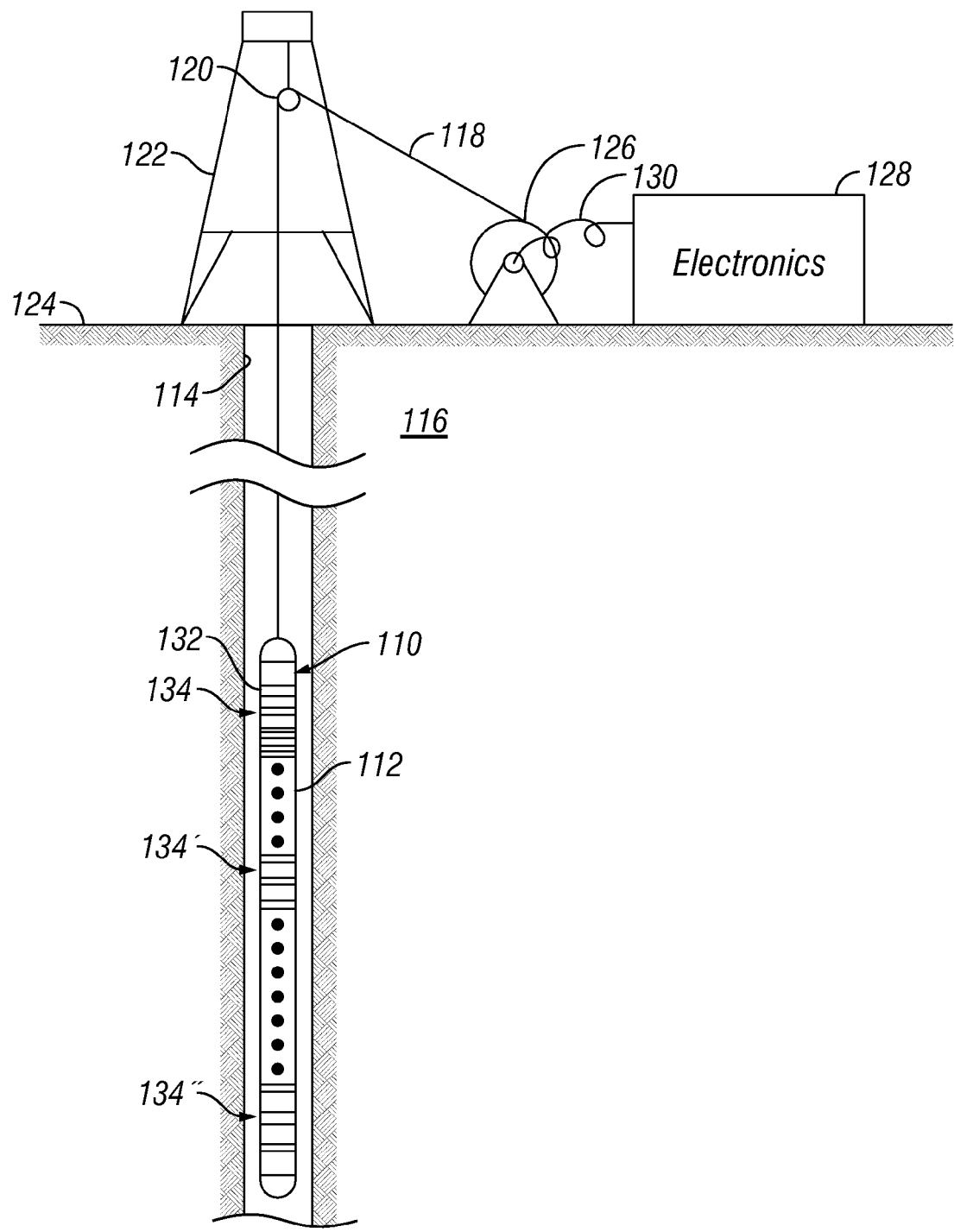
FIG. 1 shows a schematic of a resistivity tool deployed in a wellbore along a wireline according to one embodiment of the present disclosure.

FIG. 1 shows an exemplary resistivity tool 110 disposed in a borehole 114 penetrating an earth formation 116 and supported by a carrier 118. The carrier 118 is supported and guided by a sheave wheel 120 suspended from a well structure 122 in place on the earth's surface 124 over the borehole 114. The carrier 118 is stored on a cable drum 126 which may be controlled at the surface to lower and raise tool 110 within the borehole 114 at a predetermined logging speed. Commands for controlling the operation of the tool 110 and the data collected by the instrument are transmitted electrically through the carrier 118 and via interconnecting cable 130 to an electronics package 128 located at the surface. Alternatively, a downhole processor (not shown) may be used for doing some or all of the processing downhole. The tool 110 may include an elongated mandrel or housing 112, at least one source electrode 132 located near the upper end of the instrument housing, and several groups of identical sensor electrodes 134, 134' and 134" uniformly distributed along the axis of the tool mandrel, which allow for performing a number of measurements at each logging depth. Carrier 118 may be rigid or non-rigid. Resistivity tool 110 may be coupled or combined with additional tools. Electronic module 128, on the surface 124, transmits the required operating commands downhole and in return, receives data back which may be recorded on an archival storage medium of any desired type for concurrent or later processing. The data may be transmitted in analog or digital form. Data processors such as a suitable computer, may be provided for performing data analysis in the field in real time or the recorded data may be sent to a processing center or both for post processing of the data. While a wireline conveyance system has been shown, it should be understood that embodiments of the present disclosure may be utilized in connection with tools conveyed via rigid carriers (e.g., jointed tubular or coiled tubing) as well as non-rigid carriers (e.g., wireline, slickline, e-line, etc.).

Figure 2A:
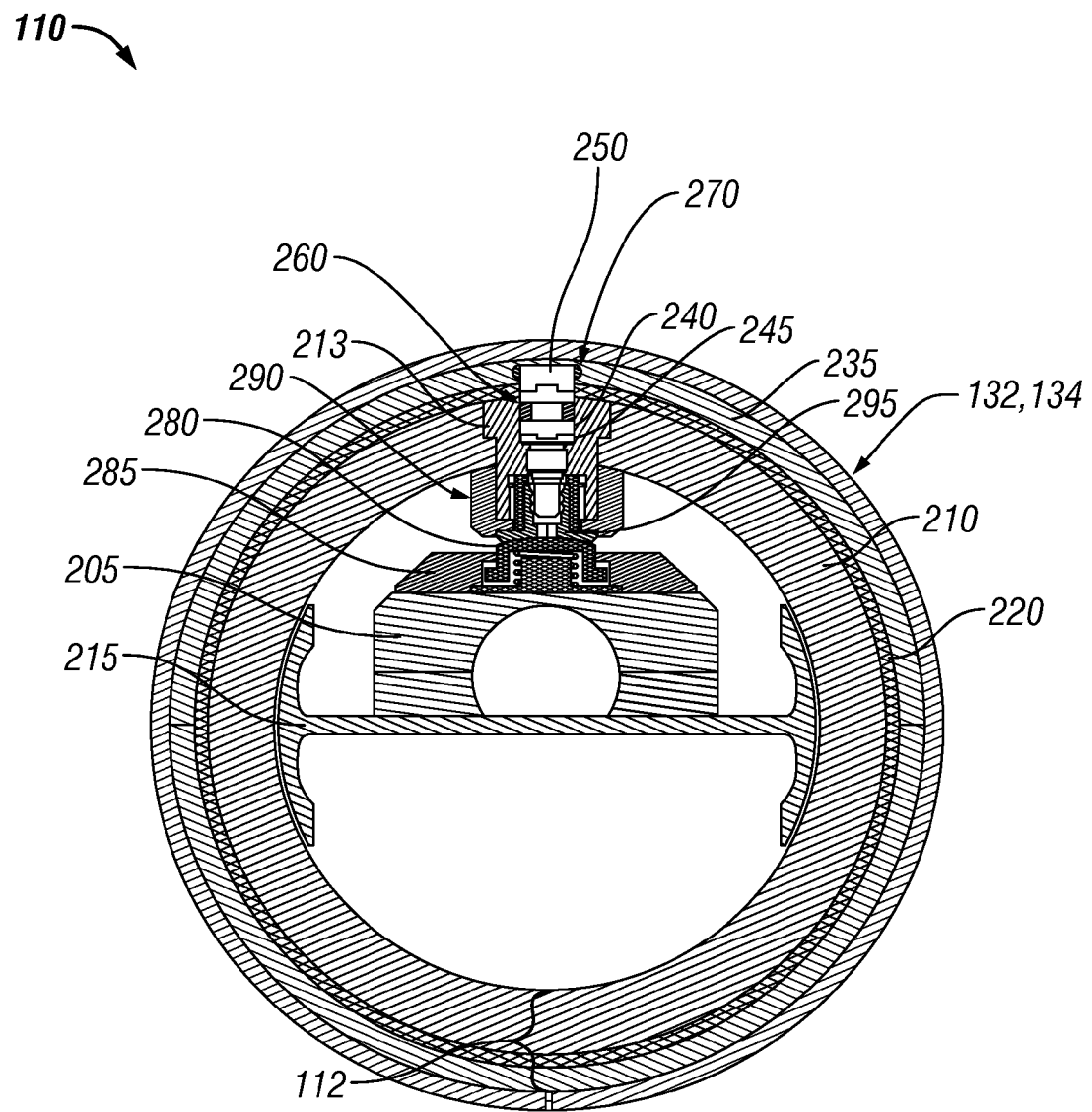
FIG. 2A shows a cross-section of the resistivity tool deployed in a wellbore according to one embodiment of the present disclosure.

FIG. 2A shows a cross-section of one embodiment of tool 110. Housing 112 may include a pressure housing 210 configured to receive components along its length. The pressure housing 210 may be substantially encompassed by an electrical isolation layer 220 configured to limit electrical communication between the interior and the exterior of housing 112. The contract ring 235 may be comprised of an electrically conductive material. Housing 112 may include a passageway 240 configured to receive an electrical conductor 250, such as a feed-through contact pin. The electrical conductor 250 allows electrical communication between the interior and exterior of the housing 112. The passageway 240 may extend through the pressure housing 210 and the electrical isolation layer 220. Electrical conductor 250 may be in electrical communication with contact ring 235. Electrical conductor 250 may be completely radially disposed within the outer circumference of the contact ring 235. In some embodiments, the pressure housing 210 may include an electrically conductive material. The electrical conductor 250 may include a non-conductive barrier 245 configured to prevent electrical communication between the electrical conductor 250 and the pressure housing 210. The barrier 245 may include an electrical insulator as would be understood by one skill in the art. In some embodiments, the pressure housing 210 may, optionally, include a bung 213. Bung 213 may be configured to act as an attachment point for a connector rail 290 and lengthen passageway 240.

To maintain fluid isolation between the interior and exterior of housing 112, the tool 110 may include at least one sealing interface 260 formed in the passageway 240 may be configured. The sealing interface 260 may be disposed between the electrical conductor 250 and at least one of: (i) the electrical isolation layer 220 and (ii) the pressure housing 210. The sealing interface 260 may be formed at least partially by, but is not limited to, one or more of: (i) a sealing element and (ii) an elastomeric seal. In some embodiments, the sealing interface 260 may include contact between the pressure housing 210 and the electrical isolation layer 220 in the form of one of: (i) a glass to metal seal and (ii) a metal to metal seal. Thus, generally, the sealing interface 260 may be any structure or structures that form a fluid barrier in the passageway 240.

The housing 112 may be encompassed by an electrode 132, 134. The exterior surface of the housing 112, which may include contact ring 235 and electrical isolation layer 220, may be configured to receive electrode 132, 134. The electrode may be in electrical communication with at least one electrical component 280 disposed inside the pressure housing 210. The at least one electrical component 280 may include, but is not limited to, one or more of: (i) a power supply and (ii) a power conductor. The exemplary power conductor assembly shown in FIG. 2A includes power conductor 280 mounted in non-conductive contact block 285 and configured to supply electrical power to the electrode 132, 134 through the electrical conductor 250. The exemplary circuit path for power to travel from the at power conductor 280 to electrode 132, 134 includes a contact button 295 in electrical communication with the electrical conductor 250. The electrical conductor 250 may communicate electricity to the electrode 132, 134 through at least one of: (i) a rigid contact and (ii) a compliant contact. Exemplary compliant contact 270 is shown as one or more canted coiled springs 270, however, other compliant contacts may be used, including, but not limited to, (i) leaf springs and (ii) contact springs.

Embodiments of the present disclosure may be configured to allow the removal/installation of electrical devices without impairing the sealing interface 260. The at least one electrical component 280 may be configured to slidingly engage with a connector rail 290 on the interior of pressure housing 210. If pressure housing 210 includes optional bung 213, the connector rail 290 may be disposed along one or more of: (i) bung 213 and (ii) the interior of pressure housing 210. Connector rail 290 may be configured to relieve mechanical stress on the contact pin 250 when the at least one electrical component 280 is moved. The connector rail 290 may be configured to at least partially house a contact button 295 configured to provide electrical communication between electrical conductor 250 and the at least one electrical component 280. The at least one electrical component 280 may be connected to a mount 205 and a track 215 configured for easy removal from/installation into the pressure housing 210. The at least one electrical component 280 may be removed/installed from the pressure housing 210 without impairing sealing interface 260. Thus, the at least one electrical component 280 may move between an electrically connected state and electrically disconnected state with contact pin 250 without impairing sealing interface 260. Likewise, electrodes 132, 134 may be removed from/installed on the electrical isolation layer 220 without impairing sealing interface 260. Thus, electrode 132, 134 may move between an electrically connected state and electrically disconnected state with contact pin 250 without impairing sealing interface 260.

Electrodes 132, 134 may be disposed on the surface of housing 112 by different methods, including, but not limited to, one of: (i) sliding, (ii) clamping, and (iii) coil wrapped. Electrode 132, 134 may be configured to slide along the housing 112 in one or more of: (i) a longitudinal direction and (ii) circularly. This freedom of motion may reduce damage to the electrode 132, 134, housing 112, and contact pin 250 when the resistivity tool 110 impacts the sides of the borehole 114 during conveyance.

Figure 2B:
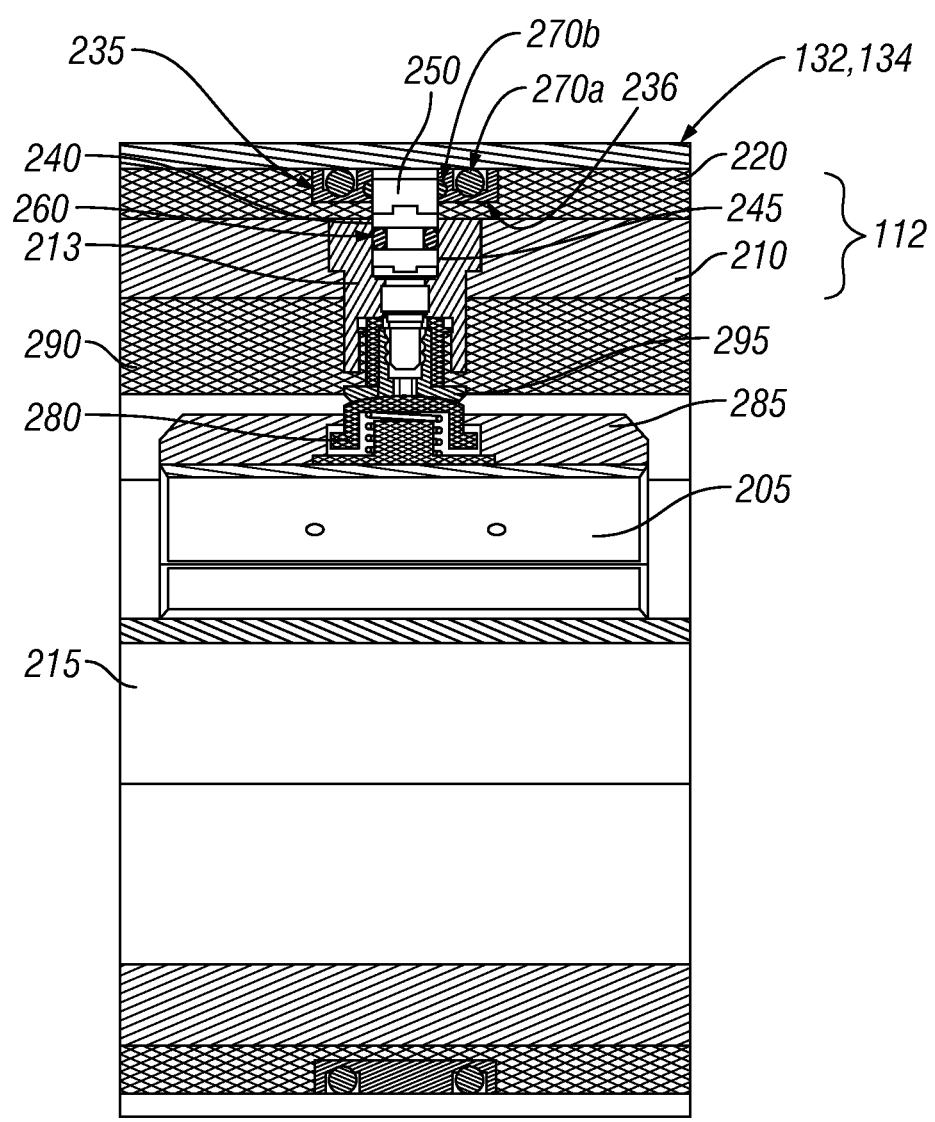
FIG. 2B shows a longitudinal section of the resistivity tool according to one embodiment of the present disclosure.

FIG. 2B shows a longitudinal section of part of tool 110. The exemplary contact 270 is shown with two canted coiled springs 270a, 270b. Canted coil spring 270a may maintain electrical communication between the contact ring 235 and electrode 132, 134. Canted coil spring 270b may maintain electrical communication between the contact ring 235 and the contact pin 250. The electrical isolation layer 220 may include a recessed area 236 configured to receive a contact ring 235.

Figure 3:
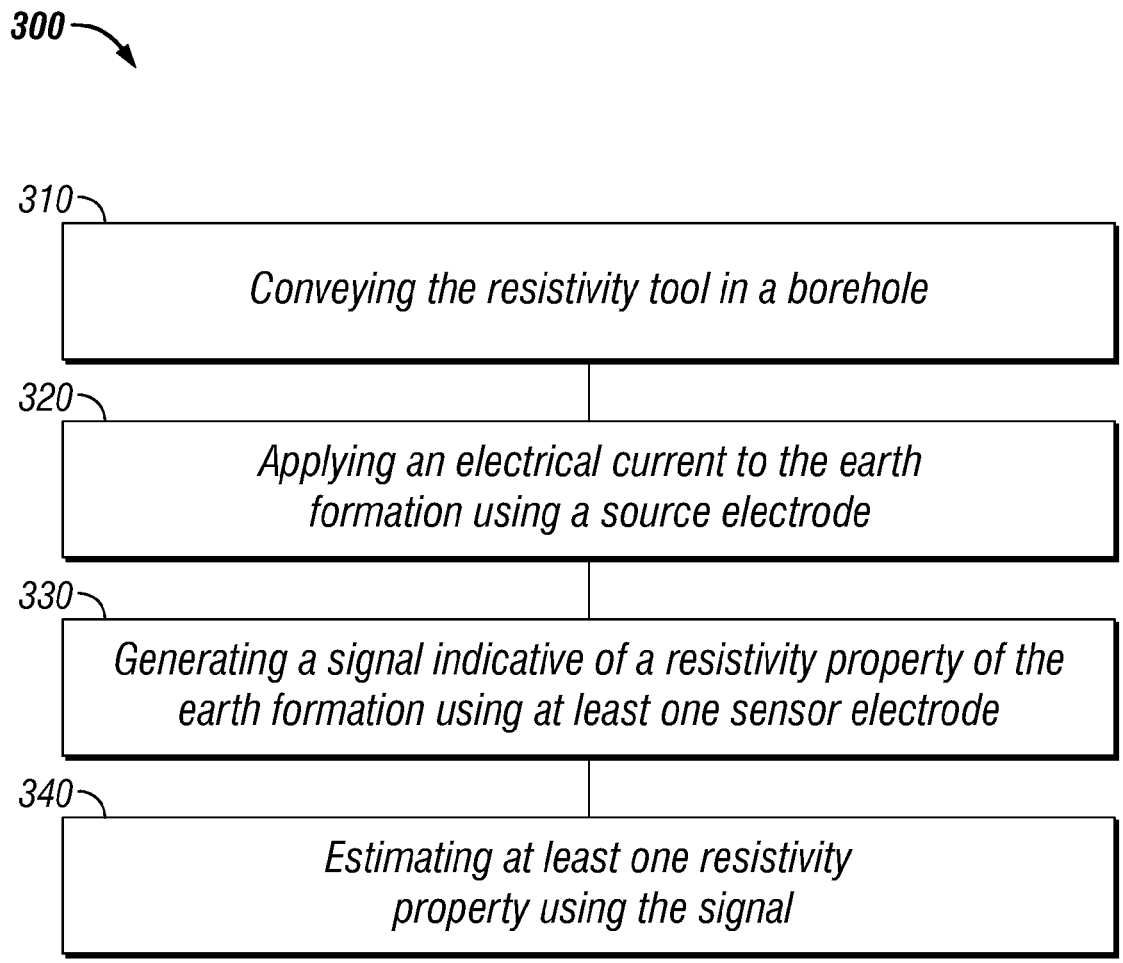
FIG. 3 shows a flow chart of a method for conducting resistivity logging operations using a resistivity tool according to one embodiment of the present disclosure.

FIG. 3 shows an exemplary method 300 according to one embodiment of the present disclosure. In method 300, a resistivity tool 110 is conveyed within a borehole 114 adjacent to a formation 116 in step 310. Then, in step 320, an electric current is applied to the earth formation 116 using at least one source electrode 132. In step 330, a signal may be generated by at least one sensor electrode 134, 134', 134" in response to the applied current, the signal being indicative of a resistivity property of the earth formation 116. In step 340, at least one resistivity property of the earth formation 116 may be estimated using the signal.

Implicit in the processing of the data is the use of a computer program implemented on a suitable non-transitory machine readable medium that enables the processor to perform the control and processing. The term processor as used in this application is intended to include such devices as field programmable gate arrays (FPGAs). The machine readable medium may include ROMs, EPROMs, EAROMs, Flash Memories and Optical disks. As noted above, the processing may be done downhole or at the surface, by using one or more processors. In addition, results of the processing, such as an image of a resistivity property, can be stored on a suitable medium.

While the foregoing disclosure is directed to the one mode embodiments of the disclosure, various modifications will be apparent to those skilled in the art. It is intended that all variations be embraced by the foregoing disclosure.

What is claimed is:

1. An apparatus for downhole use, comprising:
   an electrical conductor;
   at least one electrical component in electrical communication with the electrical conductor; and
   a housing having a passageway receiving the electrical conductor and an interior receiving the at least one electrical component; and
   a sealing interface configured to maintain fluid isolation across the passageway, wherein the at least one electrical component is configured to move between an electrically connected state and an electrically disconnected state with the electrical conductor while maintaining the sealing interface.

2. The apparatus of claim 1, further comprising:
   an electrode in electrical communication with the electrical conductor, the housing being configured to receive the electrode.

3. The apparatus of claim 2, wherein the electrode has an outer circumferential surface, and the electrical conductor is completely radially disposed within the outer circumferential surface.

4. The apparatus of claim 3, wherein the electrode is configured for at least one of i) rotational motion, and ii) translational motion, while in the electrically connected state.

5. The apparatus of claim 2, wherein the electrode is configured to move between an electrically connected state and an electrically disconnected state with the at least one electrical component while maintaining the sealing interface.

6. The apparatus of claim 1, wherein the housing includes:
   a contact ring in electrical communication with the electrical conductor and an electrode;
   a pressure housing configured to receive the at least one electrical component; and
   an electrical isolation layer disposed between the contact ring and the pressure housing.

7. The apparatus of claim 6, further comprising:
   a non-conductive barrier disposed between the electrical conductor and the pressure housing and configured to electrically isolate the electrical conductor from the pressure housing.

8. The apparatus of claim 6, wherein the sealing interface is formed by at least two of: the pressure housing, a sealing element, and the electrical isolation layer.

9. The apparatus of claim 1, wherein the sealing interface includes at least one of: (i) a sealing element, (ii) a glass to metal seal, (iii) a metal to metal seal, and (iv) an elastomeric seal.

10. The apparatus of claim 1, wherein the electrical communication between the electrical conductor and the contact ring includes one of: (i) rigid contact and (ii) compliant contact.

11. An apparatus for downhole use, comprising:
    an electrical conductor;
    at least one electrical component in electrical communication with the electrical conductor;
    a housing having a passageway receiving the electrical conductor and an interior receiving the at least one electrical component;
    a sealing interface configured to maintain fluid isolation across the passageway; and
    an electrode in electrical communication with the at least one electrical component and configured to move between an electrically connected state and an electrically disconnected state with the at least one electrical component while maintaining the sealing interface, wherein the housing is configured to receive the electrode, and wherein the electrical conductor is completely radially disposed within an outer circumferential surface of the electrode.

12. The apparatus of claim 11, wherein the electrode is configured for at least one of i) rotational motion, and ii) translational motion, while in the electrically connected state.

13. The apparatus of claim 11, wherein the at least one electrical component is configured to move between an electrically connected state and an electrically disconnected state with the electrical conductor while maintaining the sealing interface.

14. The apparatus of claim 11, wherein the housing includes:
    a contact ring in electrical communication with the electrical conductor and the electrode;
    a pressure housing configured to receive the at least one electrical component; and
    an electrical isolation layer disposed between the contact ring and the pressure housing.

15. The apparatus of claim 14, further comprising:
    a non-conductive barrier disposed between the electrical conductor and the pressure housing and configured to electrically isolate the electrical conductor from the pressure housing.

16. The apparatus of claim 14, the sealing interface being formed by at least two of: the pressure housing, a sealing element, and the electrical isolation layer.

17. The apparatus of claim 11, wherein the sealing interface includes at least one of: (i) a sealing element, (ii) a glass to metal seal, (iii) a metal to metal seal, and (iv) an elastomeric seal.

18. The apparatus of claim 11, wherein the electrical communication between the conductor and the contact ring includes one of: (i) rigid contact and (ii) compliant contact.

19. A method of conducting resistivity logging operations in a borehole penetrating an earth formation, comprising:
    conducting resistivity logging using a resistivity logging tool, the resistivity logging tool comprising:
    an electrical conductor;
    at least one electrical component in electrical communication with the electrical conductor;
    a housing having a passageway receiving the electrical conductor and an interior receiving the at least one electrical component;
    a sealing interface configured to maintain fluid isolation across the passageway; and
    an electrode in electrical communication with the at least one electrical component and configured to move between an electrically connected state and an electrically disconnected state with the at least one electrical component while maintaining the sealing interface, wherein the housing is configured to receive the electrode, and wherein the electrical conductor is completely radially disposed within an outer circumferential surface of the electrode.

20. The method of claim 19, further comprising:
conveying the resistivity logging tool in the borehole.

* * * * *